United States Patent [19]

Okada

[11] Patent Number: 4,465,694

[45] Date of Patent: Aug. 14, 1984

[54] DIPEPTIDE SWEETENING COMPOSITION

[75] Inventor: Yuzo Okada, Kamakura, Japan

[73] Assignee: Ajinomoto Company, Incorporated, Tokyo, Japan

[21] Appl. No.: 328,268

[22] Filed: Dec. 7, 1981

[30] Foreign Application Priority Data

Dec. 10, 1980 [JP] Japan .............................. 55-174176
Aug. 20, 1981 [JP] Japan .............................. 56-130621

[51] Int. Cl.³ ............................................. A23L 1/236
[52] U.S. Cl. ......................................... 426/3; 426/96; 426/99; 426/548
[58] Field of Search ................... 426/96, 99, 3, 548

[56] References Cited

U.S. PATENT DOCUMENTS

| | | | |
|---|---|---|---|
| 3,389,000 | 6/1968 | Fujita et al. | 426/99 |
| 3,856,699 | 12/1974 | Miyano et al. | 426/99 X |
| 3,949,094 | 4/1976 | Johnson et al. | 426/99 |
| 4,004,039 | 1/1977 | Shoaf et al. | 426/548 |
| 4,059,706 | 11/1977 | Pischke et al. | 426/96 X |
| 4,122,195 | 10/1978 | Bahosky et al. | 426/548 X |
| 4,139,639 | 2/1979 | Bahosky et al. | 426/548 X |
| 4,230,687 | 10/1980 | Sair et al. | 426/548 X |

*Primary Examiner*—Joseph M. Golian
*Attorney, Agent, or Firm*—Oblon, Fisher, Spivak, McClelland & Maier

[57] ABSTRACT

A dipeptide sweetening composition, comprising:
(a) from 20 to 60% by wt. of solid fat,
(b) from 10 to 30% by wt. of emulsifier,
(c) from 10 to 30% by wt. of polysaccharide and
(d) not more than 30% by wt. dipeptide sweetener, all of said percents being based on the weight of the composition, is stable against heat or enzymes and useful for processed and fermentation foods.

9 Claims, No Drawings

DIPEPTIDE SWEETENING COMPOSITION

BACKGROUND OF THE INVENTION

1. Field of the Invention

The present invention relates to a dipeptide sweetening composition. More particularly the present invention is concerned with a dipeptide sweetening composition in which dipeptide sweeteners are kept stable against heat or enzymes, and which can give the foods a long lasting flavor of a clear sweetness.

2. Description of the Prior Art

Dipeptide sweeteners such as α-L-aspartyl-L-phenylalanine-methylester are generally known as low calorie sweetening agents which have the quality of possessing a clear initial taste without leaving an unpleasent bitter taste, as others such as saccharin. Problems have arisen, however, in that many of them have less stability against heat or enzymes in the aqueous condition than other well-known sweeteners such as sugars, polyols and synthetic chemicals like cyclamate and saccharin.

Because of this reason, the applications of dipeptide sweeteners to processed foods, the production of which indispensably requires a prolonged exposure to moist heat, are greatly limited. Their use for fermentation foods is also restricted, because enzymatic action causes a loss of sweetness of the dipeptide sweeteners.

While dipeptide sweeteners are known are suitable sweetening agents giving a long-lasting sweetness to chewing gums (U.S. Pat. No. 3,943,258), there have arisen several problems, i.e., the stability of the dipeptide sweeteners during the manufacturing process and storing period, wherein they are kept under conditions of relatively high pH and temperature, and in contact with water, the quality of sweetness of the sweeteners during the long-lasting period of chewing, and also the longer-lasting sweetness than that of the chewing gums containing dipeptide sweeteners alone or in combination with other sweetening agents.

Measures have been taken to stabilize flavoring materials against heat or enzymes, examples of which are fat-coated 5′-nucleotide flavoring agents, and gelatin encapsulated spices or flavoring agents. These measures, however, cannot always give efficient results in that the strength of coatings or capsules is not sufficient. Concerning the improvement of the physical properties of the dipeptide sweeteners, some kinds of dextrin are employed to encapsulate the dipetide sweeteners. This improvement, however, is directed to obtain stability of dipeptide sweeteners in an aqueous condition, and not against heat or enzymes.

A need therefore continues to exist for a dipeptide sweetening composition which can be kept stable against heat and enzymes, and give to processed foods in which it is employed, a sufficient sweet taste as well as providing a long-lasting sweetness when employed in chewing foods.

SUMMARY OF THE INVENTION

Accordingly, one object of the present invention is to provide a low calorie dipeptide sweetening composition having heat and enzyme stability, and applicable to processed foods and fermentation foods.

Another object of the present invention is to provide a heat-stable dipeptide sweetening composition which gives a longer-lasting sweetness to various foods, especially chewing foods such as chewing gums, in comparison to dipeptide sweeteners alone.

It is yet another object of the invention to provide a dipeptide sweetening composition in the form of a fine powder which can be dispersed homogeneously in foods, and has no discernible effect on the sweetness quality of dipeptide sweeteners.

Briefly, these objects and other objects of the present invention as will hereinafter be more readily apparent, can be attained by a dipeptide sweetening composition which comprises a combination of (a) from 20 to 60% by wt. solid fat, (b) from 10 to 30% by wt. emulsifier, (c) from 10 to 30% by wt. polysaccharide and (d) not more than 30% by wt. dipeptide sweetener, all of said percents being based on the weight of the composition.

DETAILED DESCRIPTION OF THE PREFERRED EMBODIMENTS

The first ingredient of the composition of the present invention is a solid fat or fats. Typical examples of the solid fats used in the composition are hardened fatty acids, higher fatty acids, higher alcohols, beef tallows, waxes and resins. Though any kind of edible solid fat may be used in the composition, solid fats such as a hardened rape oil and a rice bran wax, the melting point of which is not lower than 50° C., and which do not debase the taste quality of the foods, are preferable.

The composition includes one or more solid fats in an amount ranging from 20 to 60% by wt., preferably in an amount of about 40% by wt.

A composition which contain more than about 60% by wt. of solid fats, will form oil drops on the surface of foods in which the composition is employed, under the common heating conditions of moist heating at 90° C. for conventional processed foods. On the other hand, in an amount less than about 20% by wt., the composition structure wherein the four ingredients are combined into a dipeptide sweetener stable against heat and enzymes, will easily be broken down and there is caused a tendency to lose sweetness of the dipeptide sweeteners. Such a tendency also appears in the foods which will be preserved with the coexistence of enzymes and the composition of the present invention.

As to the second ingredient, conventional emulsifiers such as glycerin fatty acid esters, sorbitan fatty acid esters, soybean phospholipids and sucrose fatty acid esters may be employed in the composition of the present invention, and among these, monoglycerides and sorbitan fatty acid esters are preferred emulsifiers for the present invention.

The composition includes one or more emulsifiers in an amount ranging from 10 to 30% by wt., preferably in an amount about 20% by wt.. More than about 30% by wt. emulsifier is unnecessary, and can cause a bad effect on the foods wherein the composition being employed. On the contrary, less than about 10% by wt. amount of emulsifiers will give oil drops under moist heating at a temperature of about 90° C. Therefore, the amount ranging from about 10 to 30% by wt. is the best range for the composition.

In connection with polysaccharides as the third ingredient, starch, dextrin, pectin, carragheenan, tamarind and the like, may be used in the composition. Any kind of polysaccharide will be applicable. However, in order to form a strong retainer of dipeptide sweeteners, waxy starches, such as a waxy corn starch or waxy rice starch, are desirable for the composition of the present invention. The amount of polysaccharides ranges from 10 to 30% by wt., preferably the composition includes about 20% by wt. of one or more polysaccharides. If the amount is more or less than the above range, its retaining function of dipeptide sweeteners will be reduced under the conventional conditions of moist heating.

Conventional dipeptide sweeteners which may be used as the fourth ingredient and as the sweetening base in the composition of the present invention include α-L-aspartyl-L-phenylalanine-methylester ("AP") and α-L-aspartyl-L-phenylalanine-ethylester. The composition includes one or more dipeptide sweeteners in an amount about 20% by wt.. More than 30% by wt. of dipeptide sweeteners will reduce the strength of the composition as a retaining agent of dipeptide sweeteners against moist heat and enzymes.

Simple methods, such as mixing the four ingredients homogeneously may be employed for preparation of the composition. In the preparation of the dipeptide sweetening composition of the present invention, specifically, the composition can be prepared by a process wherein a heat-melted fat is admixed with an emulsifier, polysaccharide and dipeptide sweetener, the admixture then being cooled and pulverized or spray-dried into a powder or granules of the composition, the size of which is preferbly smaller than US #12 mesh.

Typical examples of the use of the present dipeptide sweetening composition are as sweetening materials for processed foods such as boiled fish paste, smoked meats or fishes, cakes, breads, cookies, "miso", chocolate, desserts and milk products, as a sweetener for chewing-foods such as chewing gums, and as a seasoning for cooking.

When employed in chewing gums and the like, the dipeptide sweetening composition may preferably be added to the gum base in an amount from 0.1 to 10.0%, more preferably from 1.0 to 5.0% by wt., of dipeptide sweeteners based on the total amount of all dipeptide sweeteners; however, if other sweeteners are used in combination with dipeptide sweeteners, it may be varied in accordance with the kind and amount of the other sweeteners used. Typical examples of other sweeteners are sugars like sucrose, fructose, glucose, liquid sugar or invert sugar, polyols, like sorbitols or mannitol, stevioside, and the like.

Having generally described this invention, a further understanding can be obtained by reference to certain specific examples which are provided herein for purpose of illustration only and are not intended to be limiting unless otherwise specified.

EXAMPLE 1

Dipeptide sweetening compositions (A), (B), (C), (D) and (E) consisting of the ingredients mentioned below were prepared by admixing the melted fat with the other ingredients, cooling and pulverized the admixture into a fine powder.

| Dipeptide Sweetening composition (A) | |
|---|---|
| Rice bran wax (M.P. 79–82° C.) | 40% by wt. |
| Sorbitan fatty acid ester | 20 |
| Waxy corn starch | 20 |
| AP | 20 |
| Dipeptide Sweetening Composition (B) | |
| Hardened rape oil (M.P. 52–55° C.) | 40% by wt. |
| Sorbitan fatty acid ester | 20 |
| Waxy corn starch | 20 |
| AP | 20 |
| Dipeptide Sweetening Composition (C) | |
| -continued | |
| Hardened rape oil | 60% by wt. |
| Monoglyceride | 10 |
| Wheat starch | 10 |
| AP | 20 |
| Dipeptide Sweetening Composition (D) | |
| Bees wax (M.P. 62–70° C.) | 40% by wt. |
| Monoglyceride | 20 |
| Corn starch | 20 |
| AP | 20 |
| Dipeptide Sweetening Composition (E) | |
| Carnauba wax (M.P. 80–85° C.) | 40% by wt. |
| sorbitan fatty acid ester | 20 |
| Waxy corn starch | 20 |
| AP | 20 |

The solutions wherein the concentration of AP being 50 mg/dl (a sweetness level equal to 10 g/dl concentration of sucrose) were prepared with the compositions (A), (B), (C), (D) or (E) or AP alone as a sweetening base. After each of the solutions was heated at 90° C. for 2 hours, the remaining ratio of AP was measured. The results obtained are shown in Table 1.

TABLE 1

| | AP Remaining (%) | Notes |
|---|---|---|
| Composition (A) | 89 | Uniform dispersion of the comp. particle obtained in the solution. |
| Composition (B) | 72 | Uniform dispersion of the comp. particle obtained in the solution. |
| Composition (C) | 55 | Some drops of the melted fat appeared on the surface of the solution. |
| Composition (D) | 80 | Some coherences of the particles appeared in the solution. |
| Composition (E) | 91 | Uniform dispersion of the particles slightly colored. |
| AP alone | 28 | — |

EXAMPLE 2

40 kg of sea bass, 60 kg of fish paste, 3 kg of table salt, 1 kg of sodium glutamate, 3 kg of sweet sake, 3 kg of egg white, 5 kg of starch, 15 kg of water and 0.2 of Dipeptide Sweetening Composition (A) prepared in the same ingredients and manner as described in Example 1 were kneaded with a mixer. The kneaded mixture was made into pieces of semicylindrical shape with wooden plates and boiled at 80° C. for 40 minutes to give a boiled fish paste product.

As a control, boiled fish paste products were prepared with the substitution of 0.04 kg of AP for 0.2 kg of Dipeptide Sweetening Composition (A) in the same manner as described above.

As to the two kinds of boiled fish paste products obtained, the AP remaining ratio was measured. The results obtained are shown in Table 2.

TABLE 2

| | Amount | AP Remaining (%) |
|---|---|---|
| Control | AP 0.03% | 0 |
| Test Sample | Dipeptide Sweetening Comp. (A) 0.15% | 70 |

EXAMPLE 3

200 g of burdocks and 200 cc of water in a pan were boiled until the burdocks became soft, 5 g of gingers, 15 cc of sake, 45 cc of soy sauce and 0.5 g of Dipeptide Sweetening Composition consisting of 35% by wt. of hardened soybean oil, 20% by wt. of monoglyceride, 25% by wt. of corn starch and 20% by wt. of AP were added in the pan and boiled again. After then, sliced beeves were added to the pan and boiled for 30 minutes.

As a control, the cooked beef and burdock was prepared with the substitution of 0.1 g of AP for 0.5 g of the above dipeptide sweetening composition in the same manner as described above.

The two kinds of cooked beef and burdock obtained were organoleptically tested. The results obtained are shown in Table 3.

TABLE 3

|  | Amount | Sweetness |
|---|---|---|
| Control | AP 0.025% | Salty with little sweetness |
| Test Sample | Dipeptide Sweetening Comp. 0.125% | Proper sweetness |

EXAMPLE 4

A "miso" was admixed with a Dipeptide Sweetening Composition consisting of 40% by wt. of bees wax, 15% by wt. of sorbitan fatty acid ester, 25% by wt. of waxy corn starch and 20% by wt. of AP and the admixture was stored at 24° C.

10 days and one month thereafter, the AP remaining ratio in the admixture were measured. The results obtained are shown in Table 4.

TABLE 4

|  |  | AP Remaining (%) | |
|---|---|---|---|
|  | Amount | 10 days | one month |
| Control | AP 0.05% | 10 | 0 |
| Test Sample | Dipeptide Sweetening Comp. 0.25% | 92 | 81 |

EXAMPLE 5

Chewing gums (A) (B) and (C) consisting of the ingredients mentioned below are prepared by the conventional method wherein the warmed gum base being admixed and homogenized with the sweetening material and made into chewing gum sheets.

| Chewing Gum (A) | |
|---|---|
| Gum Base | 25 parts by wt. |
| Dipeptide Sweetening composition AP 20% Hardened rape seed oil 40% Sorbitan fatty acid ester 20% Waxy corn starch 20% | 1.75 parts by wt. |
| Flavor | 1 parts by wt. |
| Chewing Gum (B) | |
| Gum base | 25 parts by wt. |
| Dipeptide Sweetening Composition AP 20% Rice bran wax 40% Sorbitan fatty acid ester 20% Waxy corn starch 20% | 1.75 parts by wt. |
| Flavor | 1 parts by wt. |
| Chewing Gum (C) | |
| Gum base | 25 parts by wt. |
| Dipeptide Sweetening Composition AP 20% Carnauba wax 40% Sorbitan fatty acid ester 20% Waxy corn starch 20% | 1.75 parts by wt. |
| Flavor | 1 parts by wt. |

As controls, two kinds of chewing gums consisting of the ingredients mentioned below were prepared in the same manner as described above.

| Control 1 | |
|---|---|
| Gum base | 25 parts by wt. |
| Glucose | 24 parts by wt. |
| Powdered sugar | 50 parts by wt. |
| Flavor | 1 parts by wt. |
| Control 2 | |
| Gum base | 25 parts by wt. |
| AP | 0.35 parts by wt. |
| Flavor | 1 parts by wt. |

Chewing Gums (A), (B) and (C) and Controls 1 and 2 were organoleptically tested for their sweetness lasting time by the panel of 12 members who had been especially trained for this kind of test. The test was performed by measuring sweetness lasting times, the terminal points of which ranging from "to perceive almost no sweetness" to "to perceive a little bitterness". The results obtained are shown in Table 5.

TABLE 5

|  | Time (Average) |
|---|---|
| Control 1 | 5'30" |
| Control 2 | 13'10" |
| Chewing Gum (A) | 17'45" |
| Chewing Gum (B) | 25'50" |
| Chewing Gum (C) | 30'15" |

As can be seen from Table 5, Chewing Gums (A), (B) and (C) of the present invention have an 3–6 times longer lasting sweetness than the conventional chewing gum (Control 1) and in comparison to the chewing gum containing AP alone (Control 2), 3–17 minutes longer lasting sweetness can be obtained by the chewing gums which contain the compositions of the present invention.

EXAMPLE 6

Chewing Gum (D) and Control 3 consisting of the ingredients described below are prepared in the same manner as described in Example 5.

| Chewing Gum (D) | |
|---|---|
| Gum Base | 25 parts by wt. |
| Dipeptide Sweetening Composition AP 20% Carnauba wax 40% Sorbitan fatty acid ester 20% Waxy corn starch 20% | 3.75 parts by wt. |
| Flavor | 1 parts by wt. |
| Control 3 | |
| Gum base | 20 parts by wt. |
| AP | 0.75 parts by wt. |
| Flavor | 1 parts by wt. |

After having been stored at room temperature for one month, Chewing Gum (D) and Control 3 were organoleptically tested by the panel of 12 members who had been especially trained for this kind of test.

TABLE 6

| The results of Paired Comparison | | |
|---|---|---|
|  | Control | Chewing Gum (D) |
| Sweetness strength | 2 | 10** |
| Sweetness preference | 1 | 11** |

TABLE 6-continued

| The results of Paired Comparison | | |
|---|---|---|
| | Control | Chewing Gum (D) |
| Overall evaluation | 1 | 11** |

*Significant difference (5% risk ratio)
**Significant difference (1% risk ratio)

As shown in Table 6, Chewing gum (D) of the present invention has an improved stability for storage over that of AP alone and significantly preferred by the panelists.

EXAMPLE 7

Chewing Gums (E) and (F) were prepared in the same manner as described in Example 5 and organoleptically tested for their sweetness lasting time and preference in accordance with the same method as described in Example 5 and Example 6. The results obtained are shown in Table 7 and Table 8, which show the combined use of AP and the other sweeteners is also preferable.

TABLE 7

| Sweetness Lasting Time | |
|---|---|
| | Time (Average) |
| Chewing Gum (E) | 20'15" |
| Chewing Gum (F) | 30'5" |

TABLE 8

| Paired Preference | | |
|---|---|---|
| | Chewing Gum (E) | Control 3 |
| Choice | 10* | 2 |
| | Chewing Gum (F) | Control 3 |
| Choice | 10* | 2 |

What is claimed as new and desired to be secured by Letters Patent of the United States is:

1. A dipeptide sweetening composition, comprising:
   (a) from 20 to 60% by wt. of a solid ingredient selected from the group consisting of higher fatty acids, hardened fatty acids, higher alcohols, beef tallows, edible solid fats, hardened oil, waxes and resins,
   (b) from 10 to 30 by wt. of emulsifier,
   (c) from 10 to 30% by wt. of polysaccharide and
   (d) not more than 30% by wt. dipeptide sweetener, all of said percentages being based on the weight of the composition.

2. The composition of claim 1 wherein the melting point of the solid ingredient is higher than 50° C.

3. The composition of claim 1 wherein said emulsifier is selected from the group consisting of soybean phospholipids, monoglycerides, glycerin fatty acid esters, sorbitan fatty acid esters, sucrose fatty acid esters and mixtures thereof.

4. The composition of claim 1 wherein said polysaccharide is a waxy starch, dextrin, pectin, carragheenan, corn starch, wheat starch, tarmarind or mixtures thereof.

5. A method for producing the composition of claim 1 wherein:
   a molten solid ingredient is admixed with said dipeptide sweetener, said emulsifier and said polysaccharide each in the form of a powder; and
   said admixture is pulverized into particles upon cooling.

6. A method of sweetening processed foods comprising using said composition of claim 1 as a sweetening agent.

7. The method of claim 6 wherein said processed food is chewing gum.

8. The method of claim 7 wherein said chewing gum contains said composition in an amount corresponding to 0.1 to 10.0% by wt. of α-L-aspartyl-L-phenylalanine-methylester.

9. The method of claim 8, wherein the amount corresponds to from 1.0 to 5.0% by wt of α-L-aspartyl-L-phenylalanine-ethylester.

* * * * *